Patented Apr. 17, 1945

2,374,126

UNITED STATES PATENT OFFICE 2,374,126

COMPOSITION OF MATTER

Franklin Traviss Peters, Wilmington, Del., assignor to E. I. du Pont de Nemours & Company, Wilmington, Del., a corporation of Delaware No Drawing. Application June 3, 1942,
Serial No. 445,659

6 Claims. (Cl. 260—29)

This invention relates to polymers of the nylon type and more particularly to new compositions of matter comprising gels formed from the synthetic linear polyamides.

This case is a continuation-in-part of my Patent No. 2,293,760.

The polyamides from which the gels described herein are obtained are of the general type described in U. S. Patents, 2,071,250, 2,071,253, and 2,130,948. The polymers there described are high molecular weight products which generally can be obtained crystalline in structure as evidenced by X-ray powder diffraction patterns in the massive state. The high molecular weight required for the best fiber-forming properties is obtained by continuing the polymerization until the intrinsic viscosity, defined as given in the last mentioned patent, is at least 0.4. The polymer can then be cold drawn (that is, drawn under tension in the solid state) with permanent and high linear extension to yield textile fibers showing by X-ray examination molecular orientation along the fiber axis. Oriented products are also obtained by other methods of cold working, as for instance, oriented sheet material by cold rolling. The present invention is applicable also to the lower molecular weight polymers incapable of orientation to substantial degree.

The polyamides of this kind, generally speaking, comprise the reaction product of a linear polymer-forming composition containing amide-forming groups, for example, reacting material consisting essentially of bifunctional molecules each containing two reactive groups which are complementary to reactive groups in other molecules and which include complementary amide-forming groups. These polyamides can be obtained by the methods given in the above mentioned patents and by other methods, for example, by self-polymerization of a monoaminomonocarboxylic acid, by reacting a diamine with a dibasic carboxylic acid in substantially equimolecular amounts, or by reacting a monoamino-monohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants. The polyamides are best obtained from these reactants which have a unit length, as defined in the last two patents mentioned above, of at least 7. The average number of carbon atoms separating the amide groups in these polyamides is at least two.

The above described polyamides include also polymers obtained by admixture of other linear polymer-forming reactants, as for instance glycol-dibasic acid mixtures or hydroxy acids in the case of polyester-amides, with the mentioned polyamide-forming reactants. Both the simple and modified linear polyamide contain the recurring amide groups

in which X is oxygen or sulfur and R is hydrogen or a monovalent hydrocarbon radical, as an integral part of the main chain of atoms in the polymer. On hydrolysis with hydrochloric acid the amino acid polymers yield the amino acid hydrochloride, and the diamine-dibasic acid polymers yield the diamine hydrochloride and the dibasic carboxylic acid, and the amino alcohol-dibasic acid polymers yield the amino alcohol hydrochloride and the dibasic carboxylic acid.

Since the above described polyamides (also referred to as nylons) do not have a plastic character in the same sense as do rubber, neoprene, plasticized cellulose nitrate, and similar types of polymeric materials, they cannot be processed by many of the techniques used commercially. The methods applicable to the mentioned materials of the plastic type include such processing methods as working the material into sheet form on rubber mills, calendering onto fabric, stuffing into tubes and rods, and the formation of plastic sheeting by the conventional cake process.

The high melting point of the synthetic linear polyamides limits their use as molding powders since the maximum operating temperature of most commercial molding equipment is about 160° C. which is considerably below the melting point of most polyamides. Another disadvantage of these polymers in molding applications, particularly injection molding, is their narrow plastic range. As a result of this property, solidification occurs before the cold mold can be completely filled if an attempt is made to mold thin walled objects.

Although solution casting is used in most cases for preparing films, it has a number of inherent disadvantages. Even under conditions in which the rate of solvent evaporation is carefully controlled, it is impractical to solvent cast the polyamide film in thicknesses greater than approximately 5 mils without encountering poor surface conditions referred to as "orange peel." Because of the fact that substantially all of the solvent must be removed from the film before a solution cast film can be stripped from the casting support, films cannot be successfully cast from solution onto a rotating wheel. Instead it is necessary to use a long continuous polished casting belt and cast the film at such a speed that it is practically dry by the time it reaches the stripping end of the belt. This imposes slow casting speeds and requires elaborate equipment.

Previous investigation has shown that solutions of polyamides in phenol gel on standing. The resulting gels, in contrast to those of this invention, are cheesy, grainy, opaque, and do not collapse on loss of solvent to compact products but rather to spongy, opaque, and brittle products. This is true also of gels containing aqueous alcohol as the solvent medium. These materials appear to be precipitate-type rather than true gel structures and they cannot be satisfactorily processed by such techniques as calendering, milling, and stuffing as can the true gel composition of the present invention.

This invention has as an object the production of synthetic linear polyamides in a form which can be milled, calendered, stuffed, etc., and which may be molded and cast into film form without encountering the above mentioned difficulties. A further object is a method for making useful gels of synthetic linear polyamides. Other objects will appear hereinafter.

The above mentioned application Serial No. 283,124 discloses polyamide gels as well as polyamide solutions in a mixed organic solvent system containing an alcohol. Gels of this kind, the production and properties of which are described herein in greater detail, make possible the manufacture of improved polyamide articles by adapting the polymer by reason of the increased plastic flow to processing methods applicable to plastic type materials, but without the necessity of adding plasticizers or other high boiling materials which are difficult or impossible to remove from the finished product. As one of the several advantages referred to herein there may be mentioned the production of thick polyamide coatings in a single application without surface defects as compared to solution coating which for a thinner coat (limited to about 5 mils) requires careful control of evaporation and from 15 to 20 separate coats.

The gels described herein are obtained by forming the gel by suitable means from synthetic linear polyamide and mixed organic solvent containing an alcohol. The best method for obtaining these gels comprises dissolving the polyamide in a hot organic solvent mixture containing a substantial or major amount, preferably above 50% by volume, of an alcohol boiling below 210° C., the polyamide being present in amount of from about 20% to 80% of the combined weight of the polyamide and solvent, and then cooling the solution.

Gels having the most desirable physical properties are obtained with the use of a solvent system containing 50% to 90% by volume of an alcohol boiling below 210° C. and 5% to 40% by volume of an aromatic hydrocarbon or chlorinated hydrocarbon boiling below 210° C.

The gels of this invention are quite substantial in character. They vary in physical properties from hard materials having a waxy appearance and feel at maximum polyamide content to products which become more and more rubbery as the solvent content increases. The gels containing only 20% polyamide are still quite rigid. The above mentioned properties refer to those at normal or room temperatures.

On loss of solvent the gels collapse uniformly yielding the original polyamide and forming tough products which can be obtained with varying degrees of transparency depending on the amount of polyamide used and the particular solvent system.

The gels are most conveniently prepared by heating a mixture of the polyamide and solvent system under reflux conditions (or under pressure depending on the melting point of the gel to be formed) and with stirring until all the polyamide dissolves, and then cooling the solution. In the preferred practice the polyamide comprises from 25% to 50% by weight of the mixture, and the solvent system per se consists essentially of 65% to 75% by volume of methanol or ethanol (95% ethanol) and from 25% to 35% by volume of benzene or other aromatic hydrocarbon boiling below 210° C. or of a chlorinated hydrocarbon boiling below 210° C.

A slower and in general less preferred method of making the gels is to soak the polyamide in an insufficient amount of the solvent system to give a solution but enough to swell the polyamide to give a gel. The amount of solvent used for this purpose is at least 20% by weight of the combined weight of polyamide and solvent system.

This invention is applicable to all polyamides soluble in or markedly swollen by the above mentioned solvent systems. The most useful polyamides for the present purpose are the interpolyamides, that is, polyamides obtained by polymerizing a mixture of different polyamide-forming compositions. These interpolyamides can be prepared by polymerizing a diamine-dibasic acid mixture containing a plurality of one or both of the reactants, or more conveniently to insure equimolecular proportions by heating a mixture of the different diammonium salts formed on initial contact of a diamine and a dibasic acid. Interpolyamides are also prepared from a mixture of different polyamide-forming compositions at least one of which is a monoaminomonocarboxylic acid or an amide-forming derivative thereof, such as the lactam. A typical interpolyamide of this kind is that derived from a diamine, a dibasic acid and an amino acid. As examples of simple polyamides useful in making gels may be mentioned 12-aminostearic acid polymer, the polymer from 2,5-dimethylhexamethylenediamine and alpha,-alpha'-dimethyl adipic acid, and the polymer from 3,3'-diamino-dipropyl ether and adipic acid. Modified polyamides obtained by reacting a polyamide, dissolved in formic acid, with formaldehyde and an alcohol are also useful in making the gels of this invention.

The invention is further illustrated by the following examples.

*Example I*

A homogeneous mixture is prepared by stirring under reflux 25 parts by weight of an interpolyamide and 75 parts by weight of a mixture of 95% ethanol (i. e. 5% $H_2O$ and 95% $C_2H_5OH$) and toluene in a 75 to 25 ratio by volume. The interpolymer used is prepared from 40 parts of hexamethylenediammonium adipate, 30 parts of hexamethylenediammonium sebacate, and 30 parts of caprolactam. On cooling the resulting solution solidifies to a clear, translucent gel. Impact bars prepared by either compression or injection molding of this gel collapse uniformly on loss of solvent to tough, transparent bars of smaller dimensions. Injection molding is satisfactorily carried out with temperatures of 65°–75° C. in the heating cylinder and with the mold at 15°–25° C. Another sample is molded in the form of a thin walled conical cup, which is used as a covering for a shoe heel. The cup can be molded slightly larger than the heel and allowed to shrink on the heel during loss of solvent or the cup can be molded in smaller dimensions and blown with hot air to a size in which the heel will conveniently fit. A tight covering can then be obtained by heat shrinking the cup onto the heel.

*Example II*

A gel containing 72 parts by weight of a mixture of 95% ethanol and toluene in a ratio of 70 to 30 by volume and 28 parts by weight of the interpolymer, described in Example I, is prepared in the same manner as described in Example I. The resulting gel is a rigid composition with a softening point of approximately 70° C. as compared with 160° C. for the interpolyamide itself. Attractive nylon sheeting is prepared from this gel by the commercial cake process involving working the material into sheet form on cold rolls, stacking the sheets in the form of a block, fusing the block by heating to 80°–90° C. under slight positive pressure, slicing sheets of the desired thickness from the block, and finally seasoning the sheets at elevated temperatures to remove solvents. Sheeting prepared by this method in a thickness of 30 mils requires a force of 2850 lbs./sq. in. to effect cold drawing. The undrawn sheeting has a break elongation of 430%, that is, it elongates 430% before breaking, and a break tenacity of 7660 lbs./sq. in.

*Example III*

Seventy-two parts by weight of a mixture of methanol and chloroform in a ratio of 75 to 25 by volume and 28 parts by weight of an interpolyamide prepared from 70 parts of hexamethylenediammonium sebacate and 30 parts of hexamethylenediammonium adipate are heated at 105°–110° C. in a pressure autoclave equipped with an agitator. The gel obtained in this way had a softening point of 90°–95° C. which is above the boiling point of the solvent system. The gel can be converted into sheet form by working it on a rubber mill. The working characteristics of the gel are improved somewhat by operating at slightly elevated temperatures, for example, 40° to 60° C.

*Example IV*

A gel prepared as described in Example I from 30 parts by weight of the interpolyamide of Example I and 75 parts by weight of a mixture of 95% ethanol and toluene in a ratio of 75 to 25 by volume is worked into the form of tubing on a Royle screw stuffer of the type used in making commercial rubber tubing. The tubing, after seasoning to remove solvent, is tough and transparent.

The working characteristics of polyamide gels in the equipment mentioned in the above example are markedly improved by incorporating in the gel composition, either prior to or during the working operation, 5% to 20% (based on weight of the polyamide) of thiocyanate salt or 10% to 100% or more (based on weight of the polyamide) of inert material such as crown clay. Soluble thiocyanate salts, for example, sodium, calcium, ammonium, lithium, and barium thiocyanates, incorporated in this manner can be removed from the final tube by leaching in water.

*Example V*

A gel is prepared as described in Example I from 70 parts by weight of a mixture of 95% ethanol and benzene in a ratio of 70 to 30 by volume and 30 parts by weight of a modified polyamide which is obtained by reacting a formic acid solution of polyhexamethylene adipamide with formaldehyde and methanol at 25°–90° C. The gel is heated and the molten gel is poured onto a glass support kept at room temperature. The gel solidifies rapidly on the glass and the film thus formed is stripped from the glass support before substantial loss of solvent occurs. The film is then seasoned at room temperature to remove the solvent. The film thus obtained is tough and transparent.

*Example VI*

Following the general procedure described in Example III, a gel is prepared from 30 parts by weight of a mixture of cyclohexanol and chloroform in a ratio of 75 to 25 by volume and 70 parts by weight of the interpolyamide of Example III. This gel is readily converted into sheet form by working it on rolls at 35° to 40° C.

In the manufacture of some articles, for example, molded articles and tubing, the previously formed gel is used as such. In other instances, as in coating with the hot compositions, the composition is applied as a hot liquid which on cooling is converted to the gel form, and the finished article is obtained by removal of the solvent from the gel.

The methanol or 95% ethanol used in making the gels can be replaced by other alcohols boiling below 210° C., for example, propyl alcohol, isopropyl alcohol, butyl alcohol, isobutyl alcohol, furfuryl alcohol, benzyl alcohol, allyl alcohol, and cyclohexyl alcohol.

Ether alcohols, such as beta-methoxy ethanol, etc., as well as certain other solvents are desirably included with the alcohols mentioned above. The best results, however, are obtained by including with the solvent system in the amounts previously indicated aromatic hydrocarbon or chlorinated hydrocarbon liquids, such as benzene, toluene, xylene, styrene, chloroform trichlorethylene, methylene chloride, and ethylene dichloride.

Increasing the hydrocarbon or chlorinated hydrocarbon content of the solvent systems to approximately 35% by volume has somewhat the same effect on the gel properties as increasing the nylon concentration. In addition it increases the clarity and transparency of the gel compositions and of the products formed by loss of solvent from the gel. For gels containing the same amount of aromatic hydrocarbon, the clarity of the gel is increased, the melting point decreased, and the speed of gelation on cooling the melt is decreased with increased unsaturation in the aromatic hydrocarbon. For example, gel compositions containing benzene or styrene have better clarity and transparency and lower melting points then gels containing a corresponding amount of toluene or xylene; in a similar manner, gels containing toluene have better clarity and lower melting points than those containing a corresponding amount of xylene. From these relationships and from those previously given in connection with the polyamide content, it is seen that a gel composition with practically any desired properties can be prepared by varying either the ratio of solvents in the solvent mixture, the modifying solvents, or the polyamide content of the gel.

The present gel compositions can be modified with a wide variety of other materials, for example, phenol-aldehyde resins, sulfonamide-formaldehyde resins, thiocyanate salts, halogen and other type salts, for example, sulfates and phosphates, pigments such as titanium dioxide, carbon black, and barium sulfate, plasticizers, and fillers such as crown clay, calcium phosphate, etc. The working characteristics or cold flow properties of the gel compositions are, in general, markedly improved by modification with resin, plasticizer, inert filler, or soluble inorganic salts. Soluble inorganic salts as modifiers for nylon compositions behave as water leachable plasticizers; that is, they can be incorporated in the gel to improve its working properties and can be removed by leaching in water after the gel has been formed into the desired product without detriment to the final product.

The polyamide gels can be satisfactorily used as molding compositions in injection and compression molding machines, frequently at operating temperatures as low as 65°–75° C. Products formed have little tendency to stick to the molds and as a result are easily removed. By reason of the fact that films cast onto a cold support from hot melts of the polyamide gel compositions solidify quickly to form self-supporting products, films can be cast onto a cold, rotating wheel or drum, stripped from the wheel while containing substantially all of the original solvent, and dried by festooning through drying chambers. This method of gel casting has advantages over ordinary solution casting in speed of operation and in simplicity of equipment. In addition it has the advantage that the films are free from orange peel since solidification of the entire film occurs before substantial loss of solvent, leaving no fluid base in which a dried surface layer may float. A further advantage of the present process is that it provides a convenient method for preparing thick films, for example, films having thicknesses of 0.005 to 0.03 inch.

In addition to being suitable for milling, calendering, stuffing, and molding operations, the polyamide gels are suitable for the preparation of collapsible tubes by the impact extrusion methods used for the commercial preparation of collapsible tubes from lead alloys and by methods of this type which depend on the cold flow characteristics of the compositions. Laminated products containing polyamides as either the inner or outer laminae can be conveniently prepared from the gels.

As many apparently widely different embodiments of this invention may be made without departing from the spirit and scope thereof, it is to be understood that I do not limit myself to the specific embodiments thereof except as defined in the appended claims.

I claim:

1. A rigid gel comprising synthetic linear polyamide and an organic solvent therefor, said polyamide being present in amount of 20% to 80% based on the combined weight of the polyamide and solvent, and said solvent being an organic liquid containing at least 50% by volume of an alcohol boiling below 210° C., and from 5% to 40% by volume of a liquid boiling below 210° C. and selected from the group consisting of aromatic hydrocarbons and chlorinated hydrocarbons, said organic solvent consisting essentially of said alcohol and said liquid boiling below 210° C., said polyamide being one which on hydrolysis with hydrochloric acid yields material selected from the group consisting of (a) amino acid hydrochlorides, (b) mixtures of diamine hydrochloride and dibasic carboxylic acid, and (c) mixtures of amino alcohol hydrochloride and dibasic carboxylic acid.

2. The gel set forth in claim 1 in which said polyamide is an interpolyamide.

3. A process for making a gel which comprises heating a synthetic linear polyamide and organic solvent in proportion to form a solution containing from 20% to 80% by weight of the polyamide and cooling the hot solution, said solvent containing at least 50%, based on the volume of the solvent, of an alcohol boiling below 210° C. and from 5% to 40%, based on the volume of solvent, of a liquid boiling below 210° C. and selected from the group consisting of aromatic hydrocarbons and chlorinated hydrocarbons, said organic solvent consisting essentially of said alcohol and said liquid boiling below 210° C., said polyamide being one which on hydrolysis with hydrochloric acid yields material selected from the group consisting of (a) amino acid hydrochlorides, (b) mixtures of diamine hydrochloride and dibasic carboxylic acid, and (c) mixtures of amino alcohol hydrochloride and dibasic carboxylic acid.

4. The process set forth in claim 3 in which said polyamide is an interpolyamide.

5. In the manufacture of articles the steps comprising forming in desired shape the rigid gel defined in claim 1, and removing the solvent from the gel.

6. The gel defined in claim 1 in which said polyamide is the interpolymerization product of a mixture comprising hexamethylenediammonium adipate and hexamethylenediammonium sebacate.

FRANKLIN TRAVISS PETERS.